United States Patent
Atkins et al.

(10) Patent No.: US 10,674,842 B1
(45) Date of Patent: Jun. 9, 2020

(54) HINGED DEPLOYABLE MIRROR BRACKET

(71) Applicant: Protomet Corporation, Oak Ridge, TN (US)

(72) Inventors: Logan Atkins, Knoxville, TN (US); Mark Idles, Knoxville, TN (US); William Matthew Reid, Knoxville, TN (US); Jeff Bohanan, Powell, TN (US)

( * ) Notice: Subject to any disclaimer, the term of this patent is extended or adjusted under 35 U.S.C. 154(b) by 0 days.

(21) Appl. No.: 16/588,324

(22) Filed: Sep. 30, 2019

(51) Int. Cl.
*A47G 1/02* (2006.01)
*F16M 13/02* (2006.01)
*B63B 32/70* (2020.01)

(52) U.S. Cl.
CPC .............. *A47G 1/02* (2013.01); *B63B 32/70* (2020.02); *F16M 13/022* (2013.01); *F16M 2200/06* (2013.01)

(58) Field of Classification Search
CPC ........ A47G 1/02; B63B 35/85; F16M 13/022; F16M 2200/06; F16M 2200/021; F16M 2200/024; F16C 11/10; F16C 11/12; Y10T 403/32262; Y10T 403/32254; B60R 1/12; B60R 1/078; B60R 1/081; B60R 1/06; B60R 1/0605; B60R 1/0617; E05D 11/06
USPC .................... 248/477, 479; 16/322, 349, 374
See application file for complete search history.

(56) References Cited

U.S. PATENT DOCUMENTS

| | | |
|---|---|---|
| 2,732,764 A | 1/1956 | Paiks |
| 3,376,644 A | 4/1968 | Alexander |
| 3,977,645 A | 8/1976 | Deely |
| 4,111,532 A | 9/1978 | Budish |
| 4,244,548 A | 1/1981 | Sharp |
| 5,100,093 A | 3/1992 | Rawlinson |
| 5,259,582 A | 11/1993 | Delange |
| 5,419,522 A | 5/1995 | Luecke et al. |
| 5,845,885 A | 12/1998 | Carnevali |
| 5,964,443 A * | 10/1999 | Leveille ................... B60R 1/06 248/292.12 |
| 6,216,317 B1 * | 4/2001 | Chen ...................... B25G 1/063 16/430 |
| 6,364,562 B1 * | 4/2002 | Tung ...................... A45B 17/00 135/20.3 |
| 6,581,892 B2 | 6/2003 | Carnevali |
| 7,007,904 B2 | 3/2006 | Schultz |
| 7,028,959 B2 | 4/2006 | Schultz |
| 7,090,181 B2 | 8/2006 | Biba et al. |
| D546,753 S | 7/2007 | Schultz |
| D709,011 S | 7/2014 | Bohanan et al. |
| 8,770,530 B2 | 7/2014 | Bohanan et al. |
| D712,325 S | 9/2014 | Bohanan et al. |

(Continued)

*Primary Examiner* — Christopher Garft
(74) *Attorney, Agent, or Firm* — Matthew M. Googe; Robinson IP Law, PLLC (57) ABSTRACT

A mirror bracket is provided for supporting a mirror in deployed and stowed positions. The mirror bracket includes: a base; a mirror arm pivotally mounted on the base and movable between a deployed position and a stowed position; a first sloped surface of the mirror arm corresponding to the deployed position; a second sloped surface of the mirror arm corresponding to the stowed position; a pin movably mounted on the base and having a tapered end formed thereon, the pin located proximate to the mirror arm such that the pin contacts the first sloped surface when the mirror arm is in the deployed position and such that the pin contacts the second sloped surface when the mirror arm is in the stowed position.

17 Claims, 8 Drawing Sheets

(56) References Cited

U.S. PATENT DOCUMENTS

| | | | |
|---|---|---|---|
| 9,327,647 B2* | 5/2016 | Milbank | F16B 2/12 |
| 9,751,466 B2* | 9/2017 | Huang | B60R 1/06 |
| 2004/0041851 A1* | 3/2004 | Lu | E05D 11/087 |
| | | | 348/836 |
| 2007/0283790 A1* | 12/2007 | Cheng | B25G 1/063 |
| | | | 81/177.9 |
| 2008/0302946 A1* | 12/2008 | Bury | F16M 13/022 |
| | | | 248/634 |
| 2012/0032047 A1* | 2/2012 | Bohanan | F16M 11/2021 |
| | | | 248/288.11 |
| 2014/0085739 A1 | 3/2014 | Bohanan et al. | |
| 2014/0085909 A1* | 3/2014 | Ahn | F16M 11/10 |
| | | | 362/382 |
| 2015/0183374 A1 | 7/2015 | Liu | |
| 2018/0001824 A1 | 1/2018 | Bohanan et al. | |
| 2018/0066683 A1* | 3/2018 | Bury | F16M 13/022 |
| 2019/0126828 A1* | 5/2019 | Chen | B60R 1/06 |

* cited by examiner

HINGED DEPLOYABLE MIRROR BRACKET

FIELD

This disclosure relates to the field of mirror support brackets. More particularly, this disclosure relates to an adjustable mirror bracket for supporting a mirror on a watercraft.

BACKGROUND

Recreational watercraft frequently include one or more mirrors mounted near an operator of the watercraft such that the driver of the watercraft can view a water skier, wakeboarder, or wake surfer behind the watercraft. Placement of the mirror is important in that it should allow an operator of the watercraft to maintain a clear view of a person being towed by the watercraft while also placing the mirror in a position that does not obstruct a forward view of the watercraft operator.

Difficulties associated with installing mirrors on recreational watercraft include locating the mirror such that the mirror does not obstruct the placement of a close-fitting cover on the watercraft to protect the watercraft when not in use. For example, one popular location for a mirror is such that the mirror is located on a bracket that places the mirror above a windshield of the watercraft. When located above the windshield, the bracket securing the mirror typically obstructs placement of a cover of the watercraft that normally fits over the windshield.

Various mirror brackets exist that allow the mirror to be adjusted relative to the boat. For example, folding brackets exist that allow the mirror bracket and attached mirror to be folded under the windshield when not in use, thereby allowing a cover of the watercraft to be fitted closely over the windshield. However, existing brackets may not securely hold the mirror in an upright position during use and therefore allow the mirror to move during use. Other brackets may be difficult to operate and require additional time to move between folded and deployed positions.

What is needed, therefore, is a folding mirror bracket that advantageously allows a supported mirror to move between folded and deployed positions and further securely holds the mirror in the deployed position to minimize any movement of the mirror when deployed.

SUMMARY

The above and other needs are met by a folding mirror bracket that allows a supported mirror to move between folded and deployed positions. In a first aspect, a mirror bracket includes: a base; a mirror arm pivotally mounted on the base and movable between a deployed position and a stowed position; a first sloped surface of the mirror arm corresponding to the deployed position; a second sloped surface of the mirror arm corresponding to the stowed position; a pin movably mounted on the base and having a tapered end formed thereon, the pin located proximate to the mirror arm such that the pin contacts the first sloped surface when the mirror arm is in the deployed position and such that the pin contacts the second sloped surface when the mirror arm is in the stowed position.

In one embodiment, the mirror bracket includes a spindle located between the base and the mirror arm, the spindle including a lobe formed on an end thereof. The first sloped surface is formed on a first side of the lobe and wherein the second sloped surface is formed on a second side of the lobe.

In another embodiment, the mirror bracket further includes a key inserted between the mirror arm and the spindle such that the spindle rotates with the mirror arm when the mirror arm moves between the stowed position and the deployed position.

In yet another embodiment, the pin is biased towards being in contact with one of the first sloped surface and the second sloped surface when the pin is aligned proximate to one of the first sloped surface and the second sloped surface.

In one embodiment, the mirror bracket further includes a pin housing secured on the base. The pin is slidably mounted to the pin housing. In another embodiment, the mirror bracket includes a spring located between the pin and the pin housing. In yet another embodiment, the pin housing is removably installed on the base.

In one embodiment, the base of the mirror bracket further includes a first stop and a second stop. When the mirror arm is in the deployed position the mirror arm contacts the first stop of the base, and when the mirror arm is in the stowed position the mirror arm contacts the second stop of the base. In another embodiment, when the mirror arm is in the deployed position, the mirror arm is fixed in place between the first stop and the pin contacting the first sloped surface, and when the mirror arm is in the stowed position the mirror arm is fixed in place between the second stop and the pin contacting the second sloped surface.

In yet another embodiment, the base further includes an upper body portion and a lower body portion. The mirror bracket clamps onto a mounting surface between the upper body portion and the lower body portion. In one embodiment, the mirror bracket further includes an upper pad located on a surface of the upper body portion and an opposing lower pad formed on a surface of the lower body portion, the upper pad and lower pad for contacting the mounting surface.

In one embodiment, the mirror bracket further includes a mirror adjustably mounted on an end of the mirror arm that is distal from the base. In another embodiment, the mirror bracket is mountable on a recreational watercraft.

In a second aspect, a mirror bracket includes: a base; a mirror arm pivotally mounted on the base and movable between a deployed position and a stowed position; a spindle located between the base and mirror arm, wherein the spindle pivots with the mirror arm, the spindle including a lobe formed on an end thereof and having a first sloped surface of the mirror arm corresponding to the deployed position and a second sloped surface of the mirror arm corresponding to the stowed position; a pin movably mounted on the base and having a tapered end formed thereon, the pin located proximate to the mirror arm such that the pin contacts the first sloped surface when the mirror arm is in the deployed position and such that the pin contacts the second sloped surface when the mirror arm is in the stowed position.

In one embodiment, the pin is biased towards being in contact with one of the first sloped surface and the second sloped surface when the pin is aligned proximate to one of the first sloped surface and the second sloped surface. In another embodiment, the pin is biased towards being in contact with one of the first sloped surface and the second sloped surface by a spring.

In yet another embodiment, the base further includes a first stop and a second stop. When the mirror arm is in the deployed position the mirror arm contacts the first stop of the base, and when the mirror arm is in the stowed position the mirror arm contacts the second stop of the base. In one embodiment, when the mirror arm is in the deployed position, the mirror arm is fixed in place between the first stop and the pin contacting the first sloped surface. When the mirror arm is in the stowed position the mirror arm is fixed in place between the second stop and the pin contacting the second sloped surface.

In another embodiment, the mirror bracket further includes a mirror adjustably mounted on an end of the mirror arm that is distal from the base.

In a third aspect, a mirror bracket includes: a base having a first stop surface and a second stop surface; a mirror arm pivotally mounted on the base and movable between a deployed position in contact with the first stop surface of the base and a stowed position in contact with the second stop surface of the base; a spindle located between the base and mirror arm, wherein the spindle pivots with the mirror arm, the spindle including a lobe formed on an end thereof and having a first sloped surface of the mirror arm corresponding to the deployed position and a second sloped surface of the mirror arm corresponding to the stowed position; a pin movably mounted on the base and having a tapered end formed thereon, the pin located proximate to the mirror arm such that the pin contacts the first sloped surface when the mirror arm is in the deployed position and such that the pin contacts the second sloped surface when the mirror arm is in the stowed position. When the mirror arm is in the deployed position, the mirror arm is fixed in place between the first stop and the pin contacting the first sloped surface, and when the mirror arm is in the stowed position the mirror arm is fixed in place between the second stop and the pin contacting the second sloped surface.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
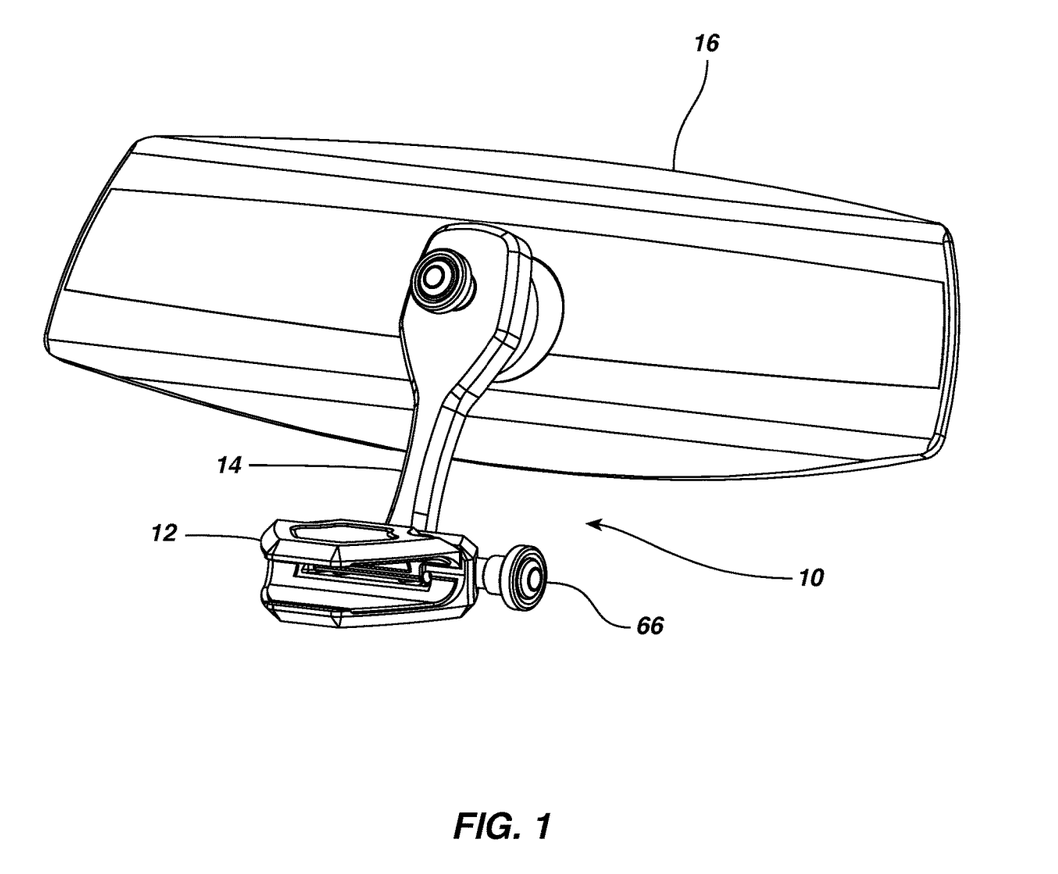
FIG. 1 shows a perspective view of a hinged mirror bracket according to one embodiment of the present disclosure.

FIG. 1 shows deployable mirror bracket 10 according to embodiments described herein. The mirror bracket 10 includes a base assembly 12 for securing the mirror bracket 10 to a support surface, such as an upper portion of a windshield frame of a recreational watercraft. A mirror arm 14 is hingedly mounted on the base assembly 12 and is movable between stowed and deployed positions. A mirror 16 is preferably adjustably mounted on an end of the mirror arm 14 such that the mirror moves from the stowed and deployed positions Embodiments of the mirror bracket 10 described herein advantageously allow the mirror 16 or any other item supported on the bracket 10 to be moved between stowed and deployed positions such that the mirror 16 is securely maintained in one of the deployed and stowed positions. Embodiments herein further provide a mirror bracket 10 that is easily and readily movable between the stowed and deployed positions without requiring significant dexterity to move the mirror 16.

Figure 2:
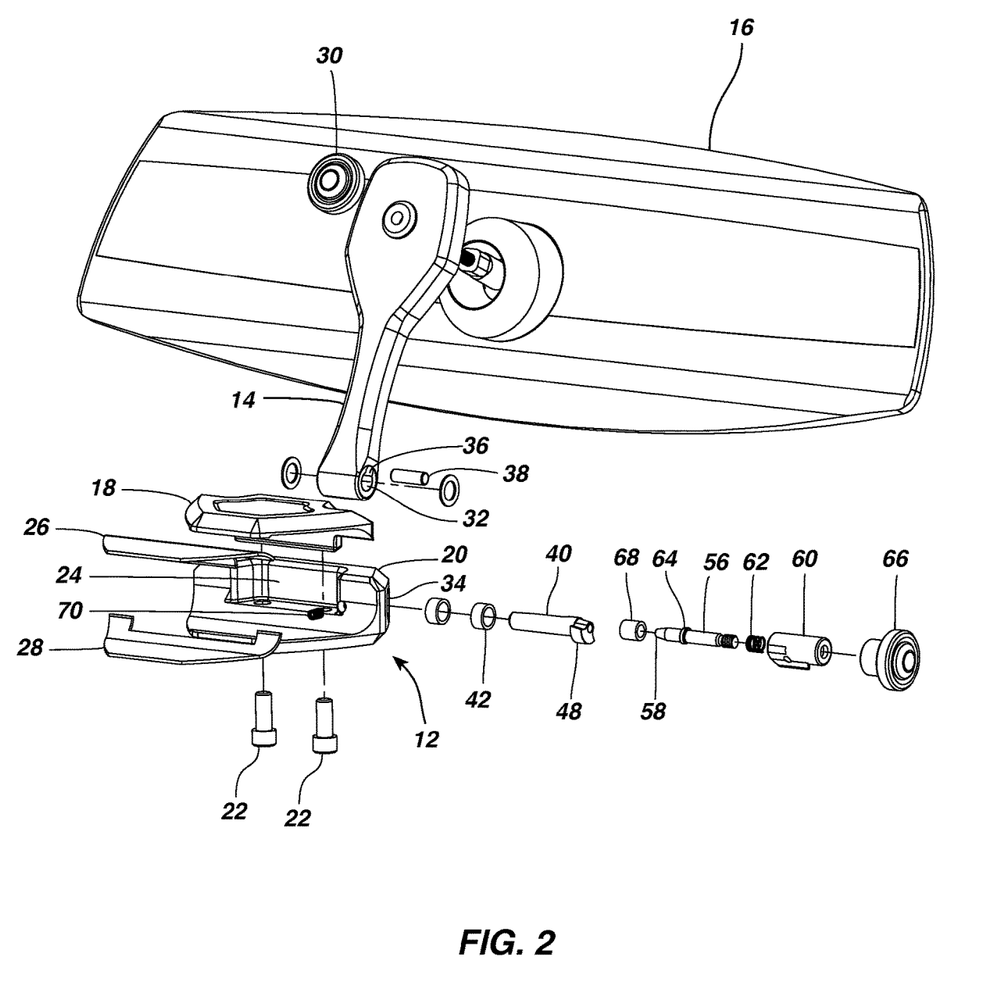
FIG. 2 shows an exploded view of a hinged mirror bracket according to one embodiment of the present disclosure.

Referring to FIG. 2, the base assembly 12 includes an upper body 18 fastened to a lower body 20, such as with one or more base fasteners 22. The lower body 20 preferably includes a cutout portion 24 shaped to receive at least a portion of the upper body 18 therein when the upper body 18 is fastened to the lower body 20. The upper body 18 includes an upper pad 26 installed on an inner surface thereof and the lower body includes an opposing lower pad 28 located on a surface of the lower body 20. The upper pad 26 and lower pad 28 are preferably formed of a resilient material that is softer than a surface of the upper body 18 and the lower body 20 for contacting a mounting surface when the mirror bracket 10 is installed.

The one or more base fasteners 22 preferably pull the upper body 18 and upper pad 26 towards the lower body 20 and the lower pad 28 such that the base assembly 12 clamps onto a surface for mounting the mirror bracket. The base assembly 12 is preferably configured to be clamped onto a mounting surface on a recreational watercraft, such as onto a windshield frame of the watercraft. However, it is also understood that embodiments herein may be implemented in various other applications. For example, the mirror bracket 10 may be installed on various other surfaces apart from on a recreational watercraft. It is also understood that embodiments of the mirror bracket may support devices other than the mirror 16 for which it may be desired to move between deployed and stowed positions.

The mirror arm 14 is preferably elongate in form and extends from a lower end to an opposing upper end that is distal from the lower end. The mirror arm 14 preferably includes a mirror knob 30 located thereon for tightening a position of the mirror 16 relative to the mirror arm 14 during adjustment of the mirror 16. The lower end of the mirror arm 14 includes a bore 32 formed therethrough. The lower body 20 includes a corresponding bore 34 of the lower body 20 that is aligned with the bore 32 formed through the lower end of the mirror arm. Referring to FIG. 2, the bore 32 formed through the lower end of the mirror arm 14 further preferably includes a keyed portion 36 formed on the bore 32 for receiving a key 38 as described in greater detail below.

A spindle 40 is located through the bore 32 of the mirror arm 14 and the bore 34 of the lower body such that the mirror arm 14 is pivotally secured to the base assembly 12.

The spindle 40 is preferably supported by one or more bushings 42 or bearings such that the spindle 40 may pivot with respect to the base assembly 12. The key 38 is shaped to fit between the keyed portion 36 of the bore 32 of the mirror arm 14 and the spindle 40 such that the spindle 40 rotates with the mirror arm 14 as it moves between deployed and stowed positions.

Figure 3:
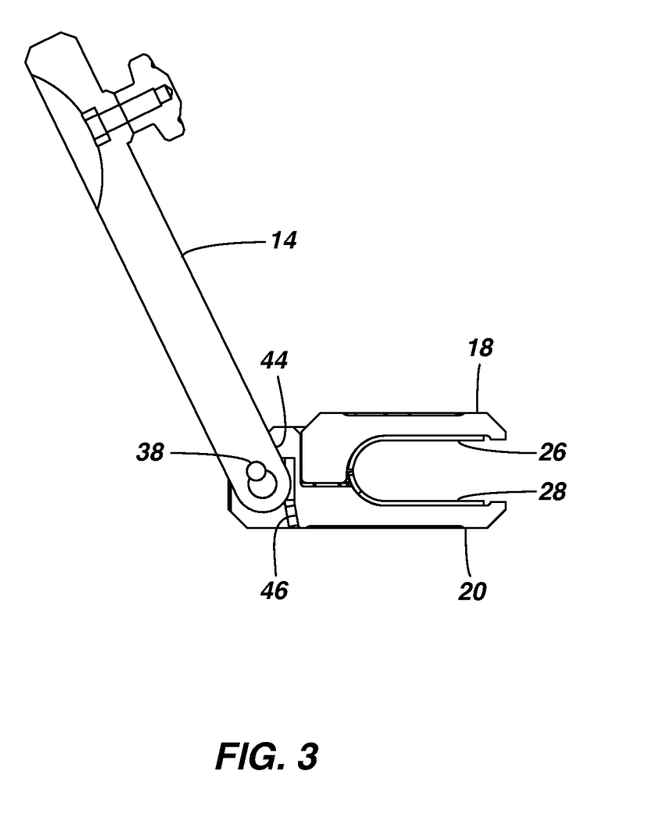
FIG. 3 shows a cross-sectional side view of a hinged mirror bracket according to one embodiment of the present disclosure.
Figure 4A:
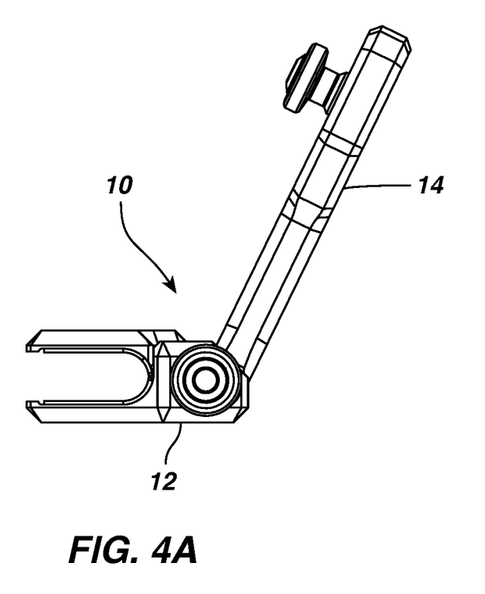
FIG. 4A shows a side view of a hinged mirror bracket according to one embodiment of the present disclosure.

FIG. 3 shows a cross-sectional side view of the mirror bracket 10 when the mirror arm 14 is in the deployed position relative to the base assembly 12. In the deployed position, at least a portion of the mirror arm 14 contacts an upper stop 44 of the base assembly 12 to prevent pivoting of the mirror arm 14 beyond the deployed position of FIG. 4A. A lower stop 46 is formed on the base assembly 12 for contacting at least a portion of the mirror arm 14 to prevent the mirror arm 14 from pivoting beyond the stowed position of FIG. 4B.

Figure 7:
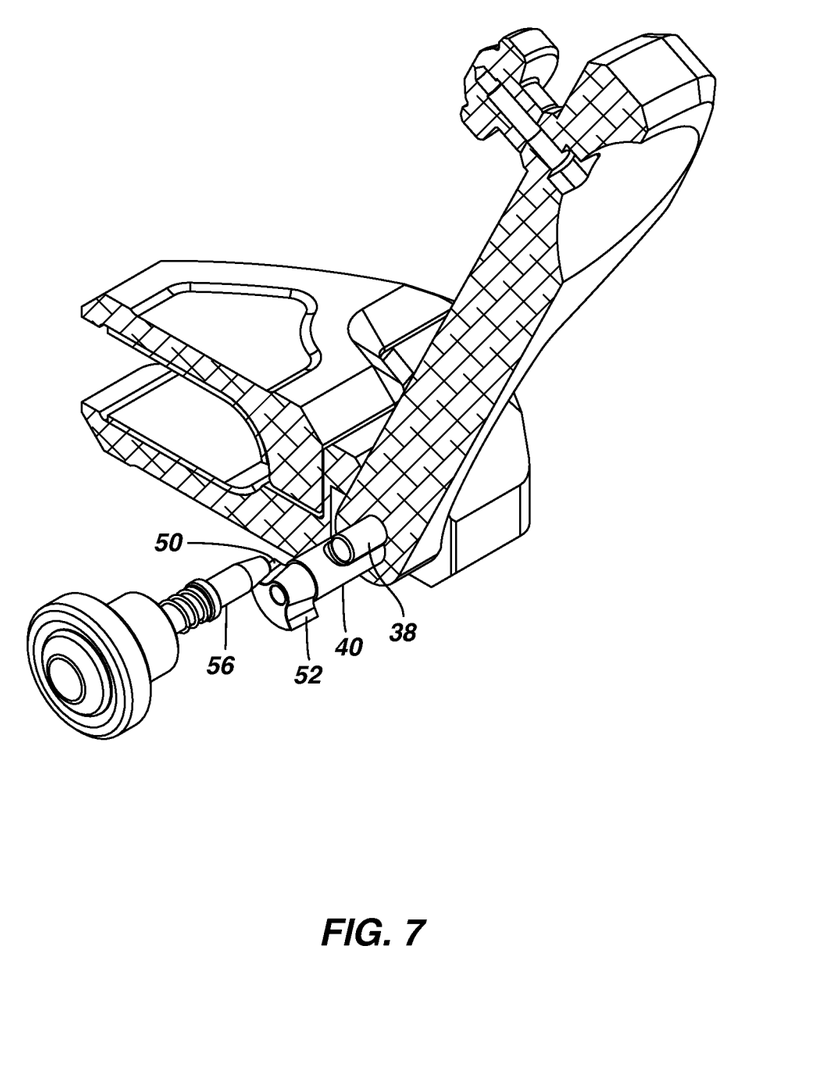
FIGS. 7 and 8 show cutaway views of a hinged mirror bracket according to one embodiment of the present disclosure.
Figure 8:
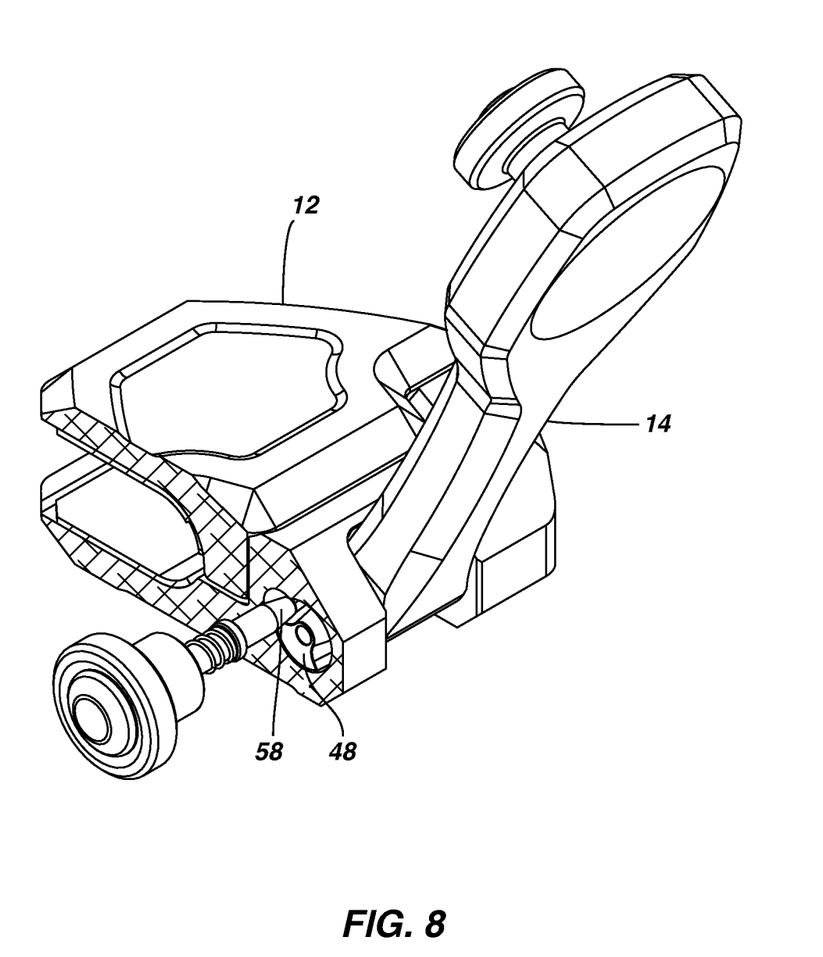

Referring again to FIG. 2, the spindle 40 includes a lobe 48 formed on an end of the spindle. The lobe 48 includes a first sloped surface 50 and a second sloped surface 52 as shown in FIG. 7. The first sloped surface 50 and second sloped surface 52 are preferably formed on opposing sides of the lobe 48 of the spindle 40. The first sloped surface 50 and a second sloped surface 52 are preferably spaced apart around the spindle 40 such that the first sloped surface 50 corresponds to the deployed position of the mirror bracket 10 and such that the second sloped surface 52 corresponds to the stowed position of the mirror bracket 10.

Figure 5A:
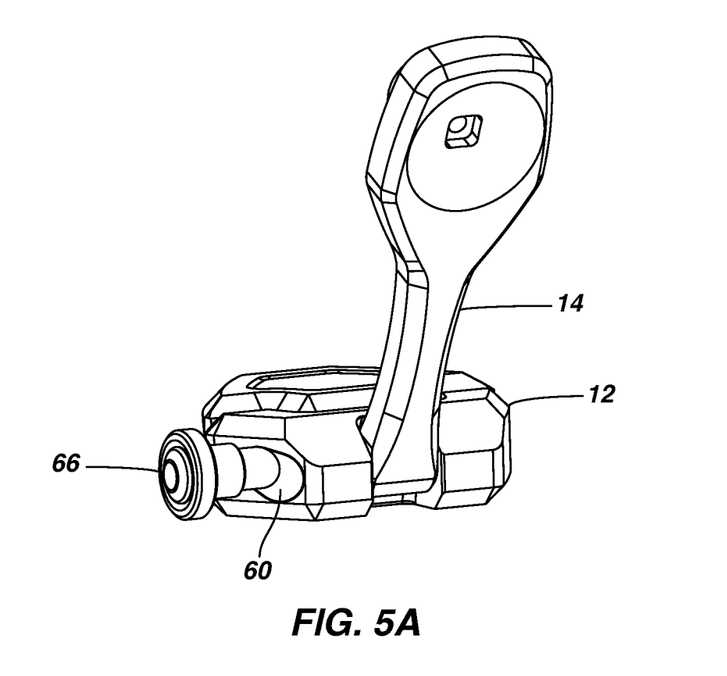
FIG. 5A shows a front perspective view of a hinged mirror bracket according to one embodiment of the present disclosure.
Figure 5B:
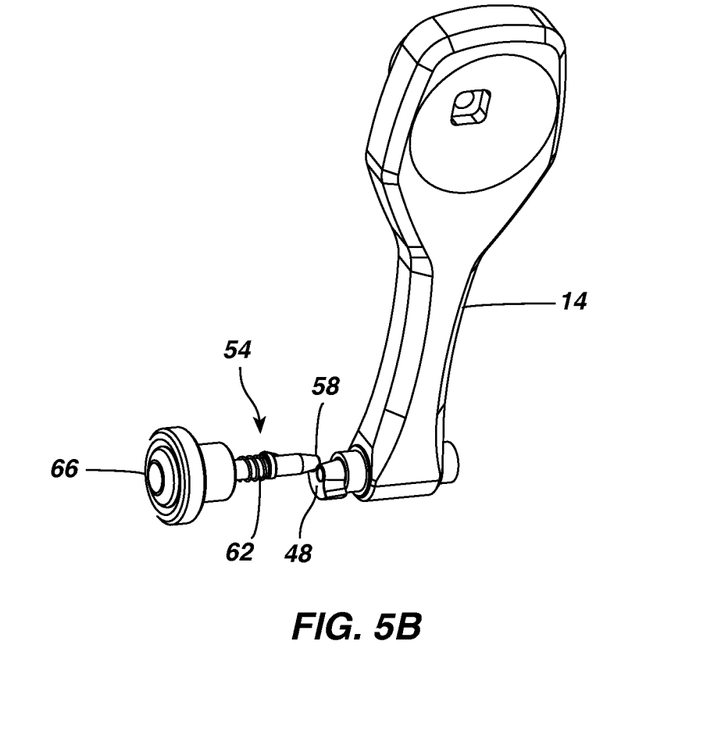
FIG. 5B shows a front perspective view of a mirror arm and pin assembly of a hinged mirror bracket according to one embodiment of the present disclosure.
Figure 6:
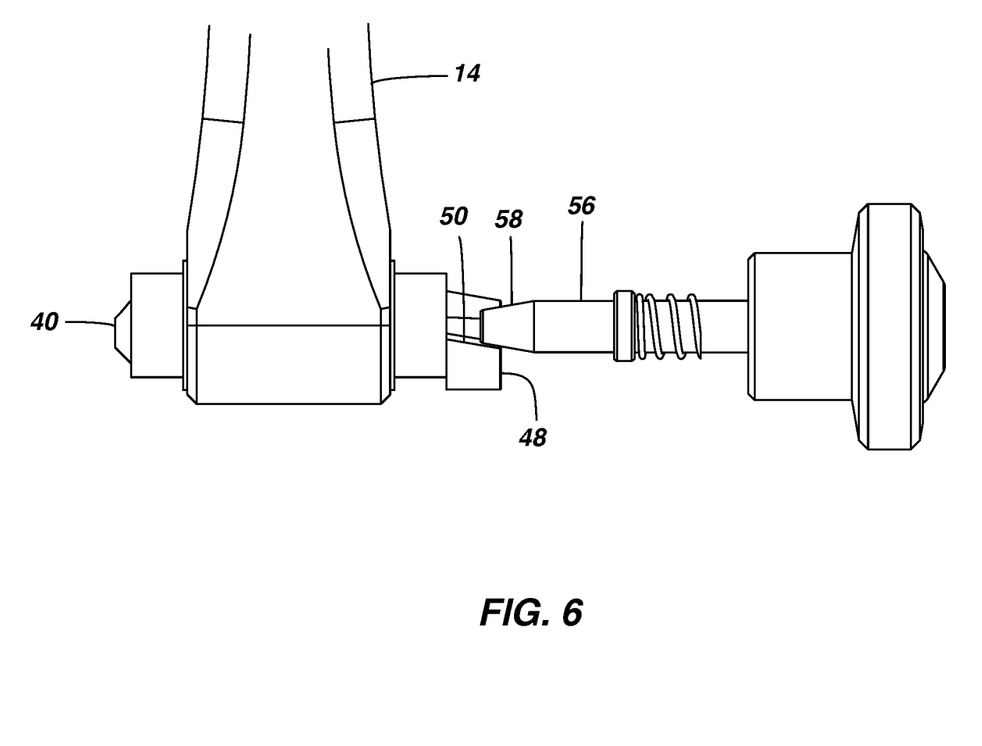
FIG. 6 shows a close-up view of a hinged mirror bracket according to one embodiment of the present disclosure.

The mirror bracket 10 further includes a pin assembly 54 (FIG. 5B) installed on the base assembly 12 for releasably engaging the lobe 48 of the spindle 40 to securely maintain the mirror arm 14 in one of the deployed position and the stowed position while allowing the mirror arm 14 to be released for movement between the deployed position and the stowed position. Referring to FIG. 6, the pin assembly 54 includes a pin 56 having a tapered end 58 located on an end of the pin 56. The tapered end 58 of the pin 56 is preferably shaped such that the tapered end 58 conforms to a shape of the first sloped surface 50 and the second sloped surface 52 when the pin 56 contacts the lobe 48.

The pin assembly 54 includes a pin housing 60. The pin 56 is slidably located through the pin housing 60 such that the tapered end 58 of the pin 56 projects from an end of the pin housing 60 for contacting the lobe 48 of the spindle 40. The pin 56 is preferably slidable in relation to the pin housing 60 such that the tapered end 58 of the pin 56 is slidable from a position wherein the tapered end 58 projects from the pin housing 60 to a position substantially within the pin housing 60 when the pin 56 is retracted. A spring 62 is preferably located between the pin 56 and the pin housing 60 such that the pin 56 is biased towards being in contact with the lobe 48 of the spindle 40 when the pin assembly 54 is installed on the base assembly 12. As shown in FIG. 2 and FIG. 6, the pin 56 preferably includes a ridge 64 formed around the pin 56. The spring 62 is preferably located around the pin 56 and contacts the ridge 64 of the pin 56. While embodiments herein describe a spring 62 for biasing the pin 56 towards the lobe 48 of the spindle 50, it is also understood that the pin 56 may otherwise be urged into contact with the lobe 48 of the spindle 40. For example, the pin 56 may be threadably adjustable relative to the lobe 48 of the spindle 40 such that the pin 56 is urged into contact with the spindle 40.

With further reference to FIG. 6, a release knob 66 is preferably secured on an end of the pin 56 distal from the tapered end 58 of the pin 56. The release knob 66 is preferably located such that the release knob 66 may be pulled to retract the pin 56 from being in contact with the spindle 40, thereby allowing the mirror arm 14 to move with respect to the base assembly 12 as described in greater detail below. The pin assembly 54 further preferably includes a pin bushing 68 located on the pin housing 60 for allowing the pin 56 to slide with respect to the pin housing 60.

In one embodiment, the pin assembly 54 is removably secured on the base assembly 12 such that the tapered end 58 of the pin 56 is proximate to and capable of contacting the lobe 48 of the spindle 40 installed on the base assembly 12. For example, at least a portion of an end of the bore 34 formed through the lower body 20 of the mirror assembly may be sized to receive the pin housing 60 therein. The pin housing 60 may be secured within the bore 34 with a set screw 70 inserted through the lower body 20 and into contact with the pin housing 60.

Figure 4B:
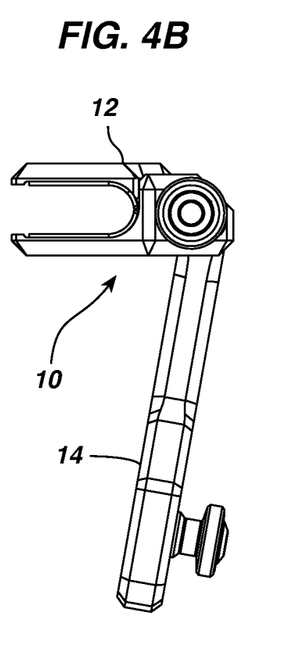
FIG. 4B shows a side view of a hinged mirror bracket in a folded position according to one embodiment of the present disclosure.

Embodiments of the mirror bracket 10 described herein enable the mirror, secured on the mirror arm, to be moved between deployed and stowed positions by disengaging the pin 56 from the spindle 40. The mirror bracket 10 is easily moved between a deployed position (FIG. 4A) and a stowed position (FIG. 4B). In the deployed position, the mirror arm 14 is substantially upright relative to the base assembly 12. When the mirror 16 is secured on the mirror arm 14, the upright position of the mirror bracket 10 preferably maintains the mirror 16 in a position such that a driver of a watercraft may view an area behind the watercraft with the mirror 16. In the stowed position, the mirror arm 14 is rotated substantially downward. In the stowed position, the mirror 16 attached to the mirror arm 14 is substantially below a mounting surface on which the mirror bracket 10 is installed, thereby allowing a cover to be placed over a top of the watercraft without interference by the mirror 16.

When the mirror bracket 10 is in the deployed position, the spring 62 urges the tapered end 58 of the pin 56 against the first sloped surface 50. When the tapered end 58 of the pin 56 contacts the first sloped surface 50 of the spindle 40, the mirror arm 14 is urged against and into contact with the upper stop 44 of the base assembly 12 (FIG. 7), thereby preventing substantial movement of the mirror arm 14 relative to the base assembly 12. When the mirror bracket 10 is in the stowed position, the spring urges the tapered end 58 of the pin 56 against the second sloped surface 52. When the tapered end 58 of the pin 56 contacts the second sloped surface 52 of the spindle 40, the mirror arm 14 is urged against and into contact with the lower stop 46 of the base assembly 12, thereby preventing substantial movement of the mirror arm 14 relative to the base assembly.

To move the mirror arm 14 from one of the stowed position or deployed position to the other of the stowed position or deployed position, a user grasps and pulls the release knob 66. When the release knob 66 is pulled, the pin 56 is retracted such that the tapered end 58 of the pin 56 is not in contact with the lobe 48 of the spindle 40. When the tapered end 58 is retracted from the lobe 48 of the spindle 40, the mirror arm 14 is free to rotate with respect to the base assembly 12. The mirror arm 14 may rotate until the pin 56 is aligned adjacent one of the first sloped surface 50 or second sloped surface 52 of the spindle 40. When the pin 56 is aligned adjacent one of the first sloped surface 50 or second sloped surface 52, the pin 56 is urged out of the pin housing 60 and into contact with one of the first sloped surface 50 or the second sloped surface 52, thereby securing the mirror arm 14 in either of the deployed or stowed position.

The mirror bracket 10 advantageously enables a user to readily move the mirror between the stowed and deployed positions without requiring significant manipulation of the mirror bracket. Further, when the mirror bracket is secured in either of the deployed or stowed positions, the mirror is securely held in place with substantially little play between the mirror and bracket, thereby providing a stable mount for the mirror during use.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A mirror bracket comprising:
   a base including a first stop and a second stop;
   a mirror arm pivotally mounted on the base and movable between a deployed position and a stowed position;
   a first sloped surface of the mirror arm corresponding to the deployed position;
   a second sloped surface of the mirror arm corresponding to the stowed position;
   a pin movably mounted on the base and having a tapered end formed thereon, the pin located proximate to the mirror arm such that the pin contacts the first sloped surface when the mirror arm is in the deployed position and such that the pin contacts the second sloped surface when the mirror arm is in the stowed position;
   wherein when the mirror arm is in the deployed position the mirror arm contacts the first stop of the base and wherein when the mirror arm is in the stowed position the mirror arm contacts the second stop of the base.

2. The mirror bracket of claim 1, further comprising a spindle located between the base and the mirror arm, the spindle including a lobe formed on an end thereof, wherein the first sloped surface is formed on a first side of the lobe and wherein the second sloped surface is formed on a second side of the lobe.

3. The mirror bracket of claim 2, further comprising a key inserted between the mirror arm and the spindle such that the spindle rotates with the mirror arm when the mirror arm moves between the stowed position and the deployed position.

4. The mirror bracket of claim 1, wherein the pin is biased towards being in contact with one of the first sloped surface and the second sloped surface when the pin is aligned proximate to one of the first sloped surface and the second sloped surface.

5. The mirror bracket of claim 4, further comprising a pin housing secured on the base, wherein the pin is slidably mounted to the pin housing.

6. The mirror bracket of claim 5, further comprising a spring located between the pin and the pin housing.

7. The mirror bracket of claim 5, wherein the pin housing is removably installed on the base.

8. The mirror bracket of claim 1, wherein when the mirror arm is in the deployed position, the mirror arm is fixed in place between the first stop and the pin contacting the first sloped surface, and wherein when the mirror arm is in the stowed position the mirror arm is fixed in place between the second stop and the pin contacting the second sloped surface.

9. The mirror bracket of claim 1, the base further comprising an upper body portion and a lower body portion, wherein the mirror bracket clamps onto a mounting surface between the upper body portion and the lower body portion.

10. The mirror bracket of claim 9, further comprising an upper pad located on a surface of the upper body portion and an opposing lower pad formed on a surface of the lower body portion, the upper pad and lower pad for contacting the mounting surface.

11. The mirror bracket of claim 1, further comprising a mirror adjustably mounted on an end of the mirror arm that is distal from the base.

12. The mirror bracket of claim 11, wherein the mirror bracket is mountable on a recreational watercraft.

13. A mirror bracket comprising:
   a base including a first stop and a second stop;
   a mirror arm pivotally mounted on the base and movable between a deployed position and a stowed position;
   a mirror adjustably mounted on an end of the mirror arm that is distal from the base;
   a spindle located between the base and mirror arm, wherein the spindle pivots with the mirror arm, the spindle including a lobe formed on an end thereof and having a first sloped surface of the mirror arm corresponding to the deployed position and a second sloped surface of the mirror arm corresponding to the stowed position;
   a pin movably mounted on the base and having a tapered end formed thereon, the pin located proximate to the mirror arm such that the pin contacts the first sloped surface when the mirror arm is in the deployed position and such that the pin contacts the second sloped surface when the mirror arm is in the stowed position;
   wherein when the mirror arm is in the deployed position the mirror arm contacts the first stop of the base and wherein when the mirror arm is in the stowed position the mirror arm contacts the second stop of the base.

14. The mirror bracket of claim 13, wherein the pin is biased towards being in contact with one of the first sloped surface and the second sloped surface when the pin is aligned proximate to one of the first sloped surface and the second sloped surface.

15. The mirror bracket of claim 13, wherein the pin is biased towards being in contact with one of the first sloped surface and the second sloped surface by a spring.

16. The mirror bracket of claim 13, wherein when the mirror arm is in the deployed position, the mirror arm is fixed in place between the first stop and the pin contacting the first sloped surface, and wherein when the mirror arm is in the stowed position the mirror arm is fixed in place between the second stop and the pin contacting the second sloped surface.

17. A mirror bracket comprising:
   a base having a first stop surface and a second stop surface;
   a mirror arm pivotally mounted on the base and movable between a deployed position in contact with the first stop surface of the base and a stowed position in contact with the second stop surface of the base;
   a spindle located between the base and mirror arm, wherein the spindle pivots with the mirror arm, the spindle including a lobe formed on an end thereof and having a first sloped surface of the mirror arm corresponding to the deployed position and a second sloped surface of the mirror arm corresponding to the stowed position;

a pin movably mounted on the base and having a tapered end formed thereon, the pin located proximate to the mirror arm such that the pin contacts the first sloped surface when the mirror arm is in the deployed position and such that the pin contacts the second sloped surface when the mirror arm is in the stowed position wherein when the mirror arm is in the deployed position, the mirror arm is fixed in place between the first stop and the pin contacting the first sloped surface, and wherein when the mirror arm is in the stowed position the mirror arm is fixed in place between the second stop and the pin contacting the second sloped surface.

\* \* \* \* \*